(12) United States Patent
Lein

(10) Patent No.: US 7,996,435 B2
(45) Date of Patent: Aug. 9, 2011

(54) APPARATUS AND METHOD FOR COMPARING COMPUTER DOCUMENTS USING TREE STRUCTURES

(75) Inventor: Mario Lein, Mannheim (DE)

(73) Assignee: SAP AG, Walldorf (DE)

( * ) Notice: Subject to any disclaimer, the term of this patent is extended or adjusted under 35 U.S.C. 154(b) by 325 days.

(21) Appl. No.: 12/325,928

(22) Filed: Dec. 1, 2008

(65) Prior Publication Data

US 2010/0138415 A1 Jun. 3, 2010

(51) Int. Cl.
 *G06F 7/00* (2006.01)
(52) U.S. Cl. ........................ 707/797; 707/802
(58) Field of Classification Search .................. 707/802, 707/803, 791, 797, 808, 809, 810
 See application file for complete search history.

(56) References Cited

U.S. PATENT DOCUMENTS

| 6,278,452 | B1 | 8/2001 | Huberman et al. | |
|---|---|---|---|---|
| 6,377,957 | B1 * | 4/2002 | Jeyaraman | 707/625 |
| 2002/0188598 | A1 * | 12/2002 | Myllymaki | 707/2 |
| 2003/0093755 | A1 * | 5/2003 | O'Carroll | 715/500 |
| 2003/0237047 | A1 | 12/2003 | Borson | |
| 2005/0039117 | A1 * | 2/2005 | Lwo | 715/513 |
| 2006/0053366 | A1 | 3/2006 | Abe et al. | |
| 2007/0130176 | A1 * | 6/2007 | Kawabe et al. | 707/100 |
| 2009/0077009 | A1 * | 3/2009 | Miszczyk et al. | 707/2 |
| 2010/0088676 | A1 * | 4/2010 | Yuan et al. | 717/120 |

FOREIGN PATENT DOCUMENTS

CA 2255047 A1 5/2000

OTHER PUBLICATIONS

EESR (from a corresponding foreign application), EP 09011097.4, mailed Mar. 15, 2010.

* cited by examiner

*Primary Examiner* — Angela M Lie
(74) *Attorney, Agent, or Firm* — Fountainhead Law Group PC

(57) ABSTRACT

Embodiments of the present invention include a computer-implemented method of comparing computer documents such as programs and XML. A hierarchical level may be specified. For each hierarchical level between a root and the specified hierarchical level, first and second searches are executed for nodes representing subsections of each document. The returned nodes from the first search correspond to subsections of the first computer document, and may be set equal to nodes representing the second document if the addresses are the same. The second search is executed on the second document, and the addresses of the nodes returned by the first search may be compared against addresses for nodes returned from the second search. Nodes are matched and marked as equal. The hierarchical level may then be increased and the process repeated until the root node is reached.

18 Claims, 12 Drawing Sheets

_US 7,996,435 B2_

APPARATUS AND METHOD FOR COMPARING COMPUTER DOCUMENTS USING TREE STRUCTURES

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

BACKGROUND

The present invention relates to computer software, and in particular, to an apparatus and method for comparing computer documents using tree structures.

Computer software documents may often be organized hierarchically. For example, FIG. 1 illustrates an XML document with subsections organized as hierarchical units. A typical XML file may include a main section 101 separated by start and end indicators 101A and 101B, which in XML are referred to as start-tags and end-tags. As used herein, the term "subsection" in the context of a program means portions of a computer program having start and end indicators between the main start and end indicators of the main section (i.e., the root) of the program. The main section 101 and subsections may include content (values) and other subsections. In XML, for example, all of the information from the start-tag to the end-tag is referred to as an XML element. In this example, section 101 ("<a>" to "</a>") includes a subsection 102 ("<b>" to "</b>"), including start 102A and end 102B, and subsection 105 ("<c>" to "</c>"), which includes start 105A and end 105B. Subsection 102 may, in turn, include content or values and more subsections 103 ("<d/>") and 104 ("<e/>"). Similarly, subsection 105 may include content or values and more subsections, such as subsection 106 ("<o/>"). From the above example it is clear that programming structures, such as XML documents, may be structured hierarchically in an almost unlimited number of configurations.

FIG. 2 illustrates a tree representation of the example program in FIG. 1. Here, the hierarchy of the XML document has been represented as a tree, with each node of the tree corresponding to a subsection of the program, and branches between the nodes represent parent-child (ancestor-descendent) relationships between the nodes. In this example, node A 201 corresponds to the main section 101 or root node of the XML document. Node A may include a value corresponding to the content between start 101A and end 101B. Values of a node are limited to the node and do not include anything from its sub-nodes or parent nodes. Similarly, node B 202 corresponds to subsection 102 of the XML document. Node B may include a value corresponding to the content between start 102A and end 102B. Likewise, node C 205 corresponds to subsection 105 of the XML document. Node C may include a value corresponding to the content between start 105A and end 105B. Finally, nodes D, E, and O 203, 204, and 206, respectively, correspond to subsections 103, 104, and 106, respectively and may each include content.

For numerous reasons, it is sometimes desirable to modify computer documents. For example, in many cases, computer documents may be modified to match an existing document. To modify a document to match the structure of an existing document, it is typically necessary to compare the structures of the two documents, delete certain subsections from the document being modified, and add certain subsections to the document being modified. However, analyzing document structures and comparing document structures can be complex and time consuming.

FIG. 3 illustrates comparison and modification of tree like structures for the example document in FIG. 1. In this example, two computer document tree structures are compared. Tree 300A may be the old structure, and tree 300B may be the desired new structure. In this simple example, it can be seen that the transformation of tree 300A into tree 300B requires the deletion of nodes X, Y, Z at 301, node D at 302, and node O at 303. Further, node F at 304, nodes D, I, E at 305, node B at 306, node H at 307, node D at 308, and node P at 309 must be inserted. Finally, children nodes of a common parent may have specific positions. Referring to FIG. 1, a document, such as a program, may include subsections in a specific order. For example, in FIG. 1 subsection D 103 precedes subsection E 104 in the document. In FIG. 3, node D at 302 in tree 300A has a specific order relative to node E. This order is different than the order of node D at 308 and a corresponding node E in tree 300B. From the example in FIG. 3, it can be seen that an analysis of the tree leads to three subsection (or subtree) deletions and six subsection insertions. Ordering of the document tree structures must also be accounted for. As computer documents grow larger and more complex, the difficulty in performing a comparison analysis and modification automatically also grows in complexity.

Thus, there is a need for improved comparison and modification techniques. The present invention solves these and other problems by providing an apparatus and method for comparing hierarchical computer artifacts that can be represented as tree like structures.

SUMMARY

Embodiments of the present invention include a computer-implemented method of comparing computer documents such as programs or XML documents, for example. A hierarchical level may be specified. For each hierarchical level between a root and the specified hierarchical level, first and second searches are executed for nodes representing subsections of each program. The returned nodes from the first search correspond to subsections of the first computer document, and may be set equal to nodes representing the second document if the addresses are the same. The second search is executed on the second document, and the addresses of the nodes returned by the first search may be compared against addresses for nodes returned from the second search. Nodes are matched and marked as equal. The hierarchical level may then be increased and the process repeated until the root node is reached.

In one embodiment, the present invention includes a computer-implemented method of comparing a first computer document and a second computer document comprising, for each of a plurality of hierarchical levels of the first computer document between a root level and a first hierarchical level, executing a first search, the first search returning one or more first nodes, wherein nodes correspond to subsections of the first computer document or second computer document, wherein each node has an address, wherein the first nodes returned by the first search correspond to subsections of the first computer document, and wherein the first nodes are outer nodes up to the first hierarchical level having no ancestor nodes designated as equal or similar, designating a first one or more nodes as equal if a node corresponding to a subsection of the second computer document has the same address as one of the first nodes returned in response to the first search, designating one or more first ancestor nodes as similar if at least one descendent node of an ancestor node is designated as equal, executing a second search, the second search returning one or more second nodes, wherein the second nodes returned by the second search correspond to subsections of the second computer document up to the first hierarchical level having no ancestor nodes designated as equal or similar, designating one or more of the first nodes at the first hierarchical level as equal to the one or more second nodes if one or more of the first nodes at the first hierarchical level from the first search have the same address as the one or more second nodes returned in response to the second search, and designating one or more second ancestor nodes as similar if at least one descendent node of said second ancestor nodes is designated as equal.

In one embodiment, the method further comprises deleting subsections of the first computer document having corresponding nodes marked as equal or similar, and inserting subsections of the second computer document having corresponding nodes marked as equal or similar into the first computer document.

In one embodiment, the method further comprises analyzing said first computer document, and in accordance therewith, generating a first model representing the first computer document as a first hierarchy having a first plurality of said nodes corresponding to subsections of the first computer document, and analyzing said second computer document, and in accordance therewith, generating a second model representing the second computer document as a second hierarchy having a second plurality of nodes corresponding to subsections the second computer document.

In one embodiment, the first hierarchical level is the deepest common level of the first and second computer documents.

In one embodiment, the method further comprises determining an address for each node returned by the first search.

In one embodiment, the address specifies a path and an index, and wherein designating a first one or more nodes as equal includes identifying nodes corresponding to the second computer document having the same path and index.

In one embodiment, the address specifies a path, and wherein designating one or more of the first nodes at the first hierarchical level as equal to the one or more second nodes includes identifying second nodes corresponding to the second computer document having the same path regardless of indices.

In one embodiment, the first and second computer documents are computer programs.

In one embodiment, the first computer document is an XML document and the second computer document is a second XML document, and wherein the nodes represent XML elements between start-tags and end-tags.

In one embodiment, the first and second searches are executed using XPATH statements.

In one embodiment, the nodes are designated as equal only if the content of the computer document subsections corresponding to the nodes are the same.

In one embodiment, the nodes are designated as equal only if the position of the document subsections corresponding to the nodes are the same.

In one embodiment, the nodes are designated as equal only if the ancestor nodes are connected together or not connected to any other nodes.

In one embodiment, the nodes are designated as equal only if the nodes have not already been marked or connected.

In one embodiment, each node is an object comprising a marked attribute indicating that the node is equal to another node in another model.

In one embodiment, each node is an object comprising a connection attribute indicating that the node is connected to another node in another model.

The following detailed description and accompanying drawings provide a better understanding of the nature and advantages of the present invention.

DETAILED DESCRIPTION

Described herein are processes for comparing computer documents using tree structures. The apparatuses, methods, and techniques described below may be implemented as a computer program (software) executing on one or more computers. The computer program may further be stored on a computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figures 1, 2:
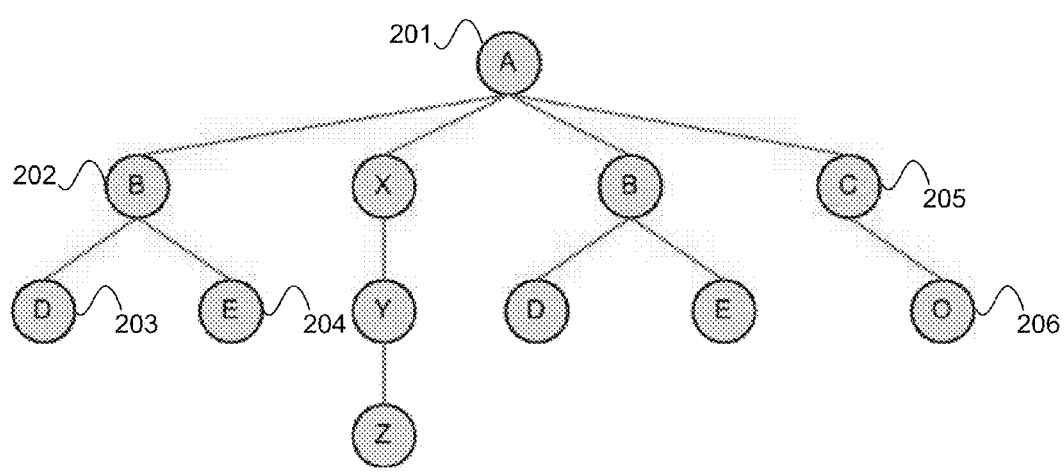
FIG. 1 illustrates an example XML document with subsections organized as hierarchical units.
FIG. 2 illustrates a tree representation of the example program in FIG. 1.
Figure 3:
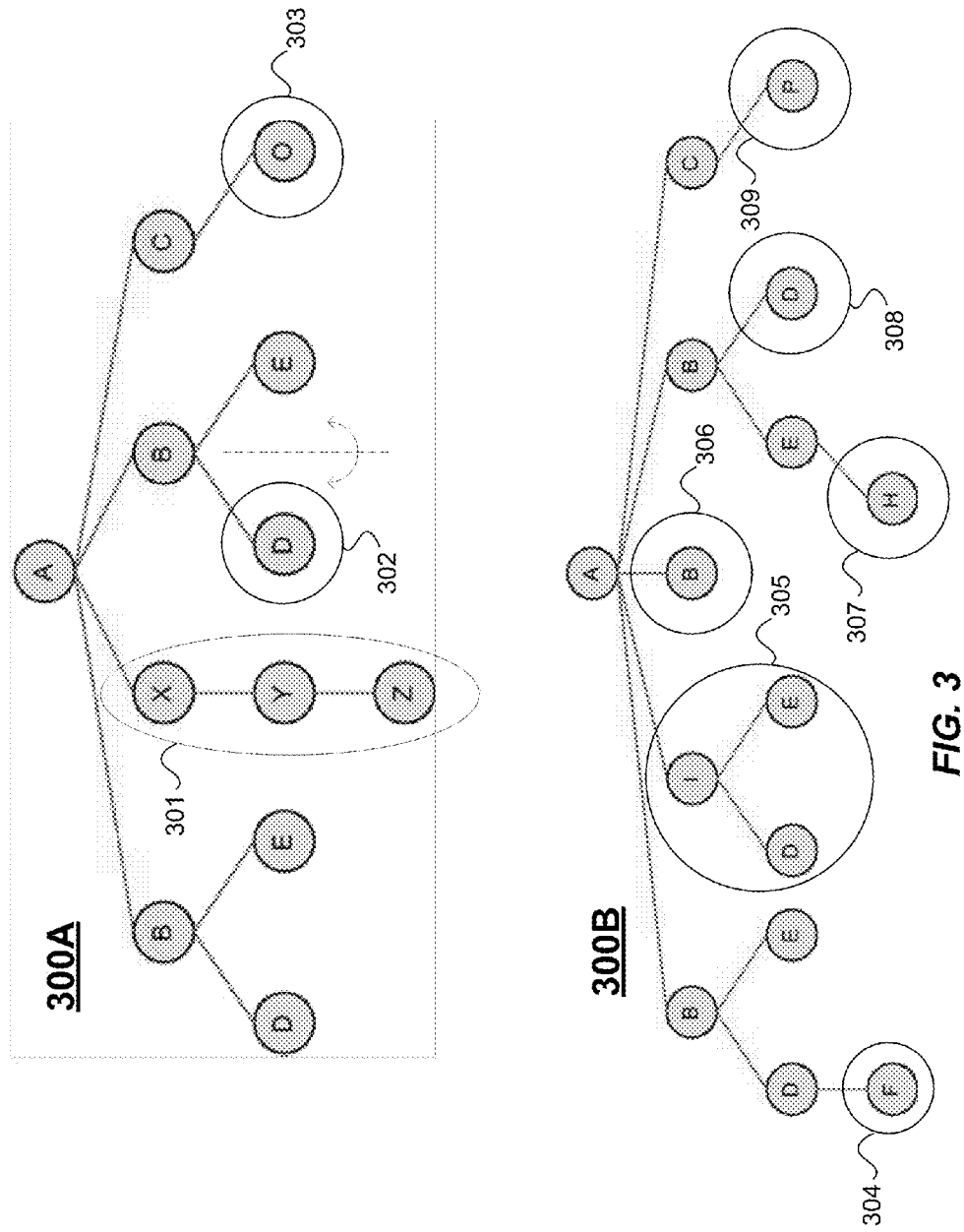
FIG. 3 illustrates comparison and modification of tree like structures for the example program in FIG. 1.
Figure 4A:
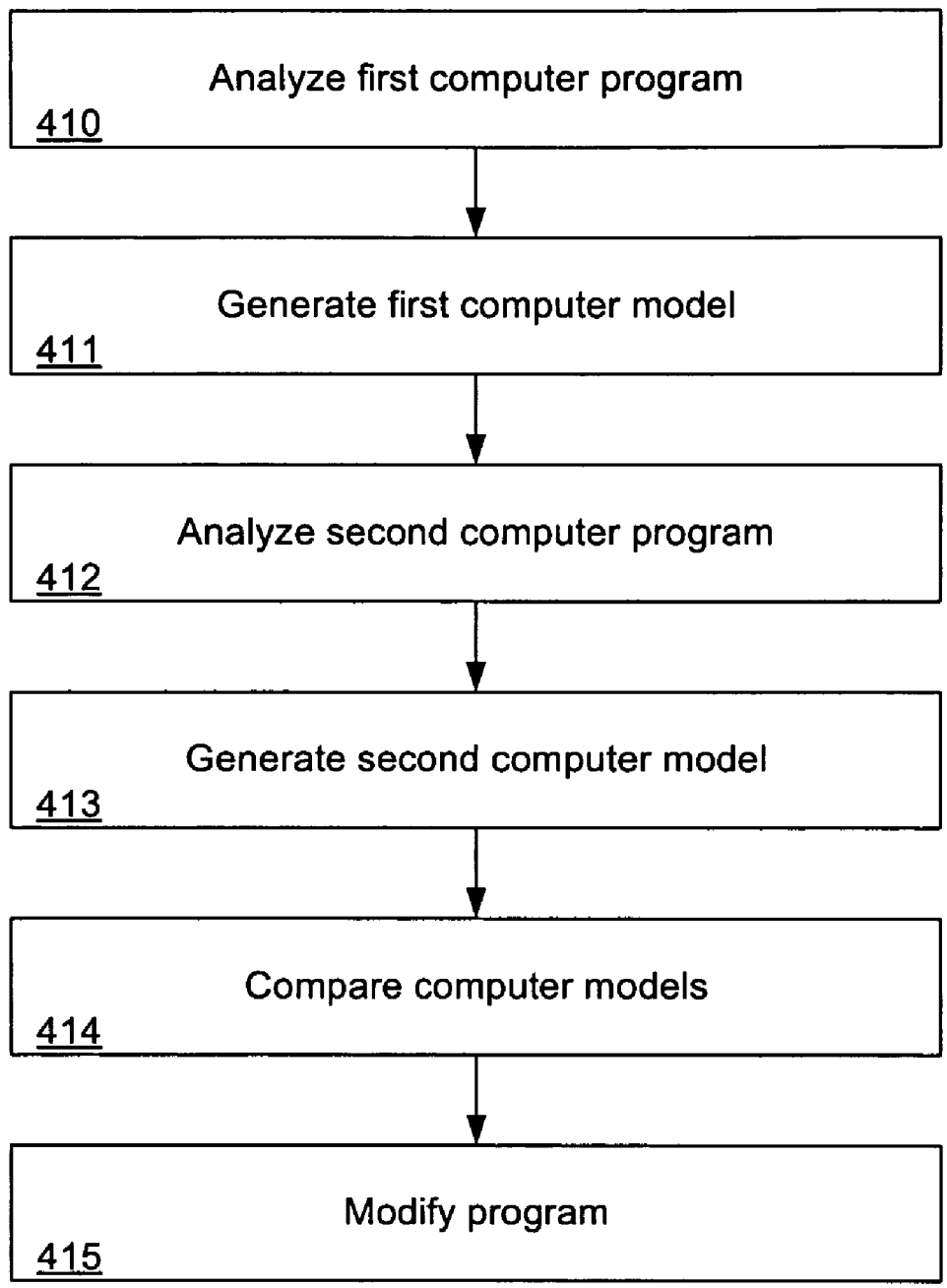
FIG. 4A illustrates a method comparing computer program structures according to an embodiment of the present invention.

FIG. 4A illustrates a method comparing computer documents structures according to an embodiment of the present invention. Computer documents that may be compared include, but are not limited to, computer program documents, XML documents, Word documents, or other computer artifacts that are hierarchical in nature and can be represented as a tree structure as set forth below. The following illustrates comparison of computer programs. Computer documents may be compared directly or by building a model of the document, where the model captures the hierarchy and other relevant information used in the comparison. Generating a model is illustrated by the following example. First, at 410, a computer document is analyzed to extract hierarchical information. For example, an XML document may be analyzed to determine the number and location of different subsections. In other applications, computer program source code, metadata, or meta-models, or other types of programming constructs may be analyzed. The hierarchy may be represented using the model. In one embodiment, the model may be a "document object model", thus a complete representation of the document in main memory may be analyzed. At 411, a model is generated representing the computer document as a hierarchy. The hierarchy may include a plurality of nodes, wherein nodes correspond to subsections of the first computer document. In one embodiment, node objects are used for each subsection of the program. A node object may have attributes as described below. At 412, a second computer document, such as another XML document or computer program, may be analyzed. Computer program software performing the analysis may generate a second model representing the second computer document as a second hierarchy having a second plurality of nodes at 413. At 414, the computer models may be compared, and at 415, either computer document may be modified as required. It is to be understood that the process described below may be implemented without generating a computer model.

Figure 4B:
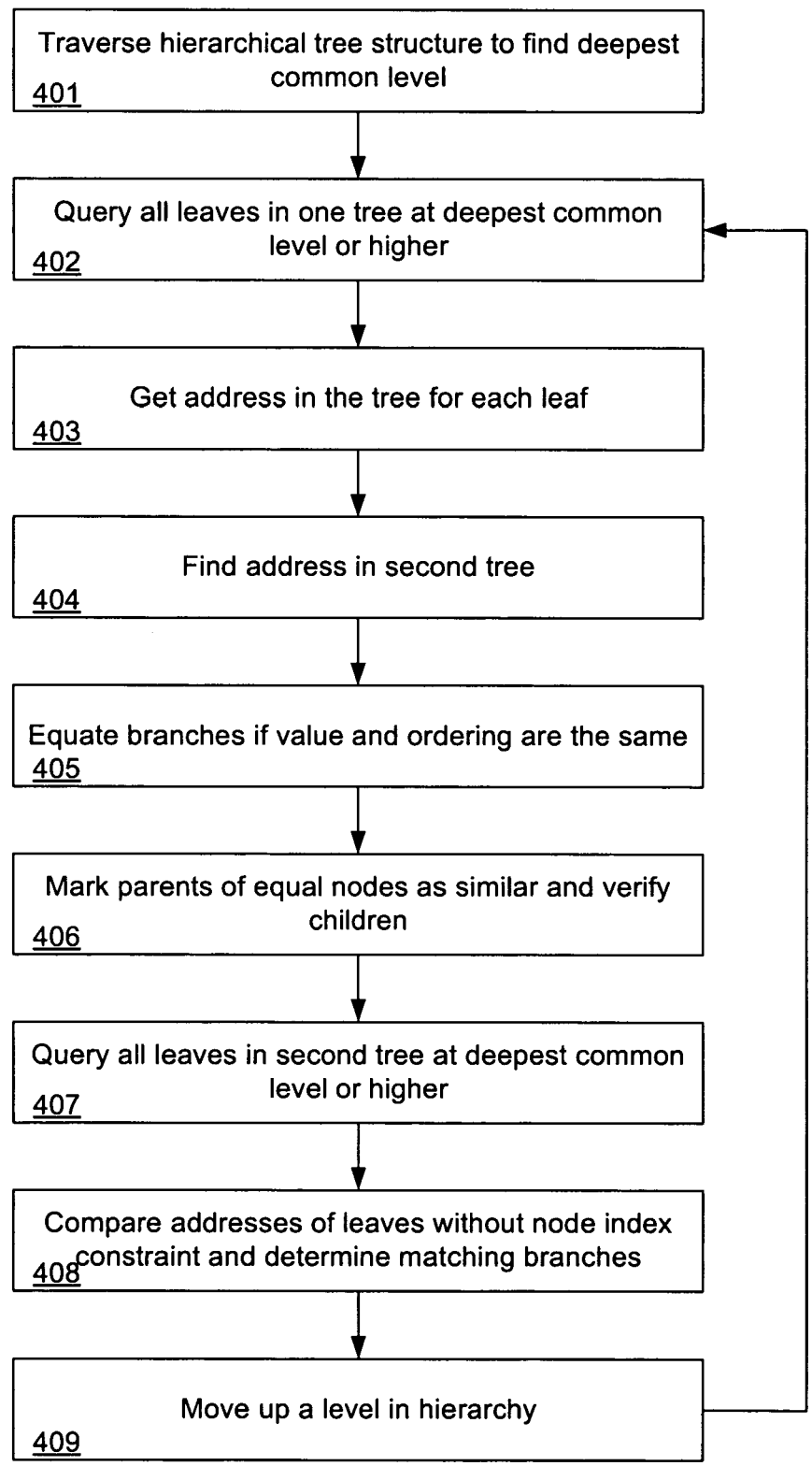
FIG. 4B illustrates a method comparing computer program structures according to an embodiment of the present invention.
Figure 5:
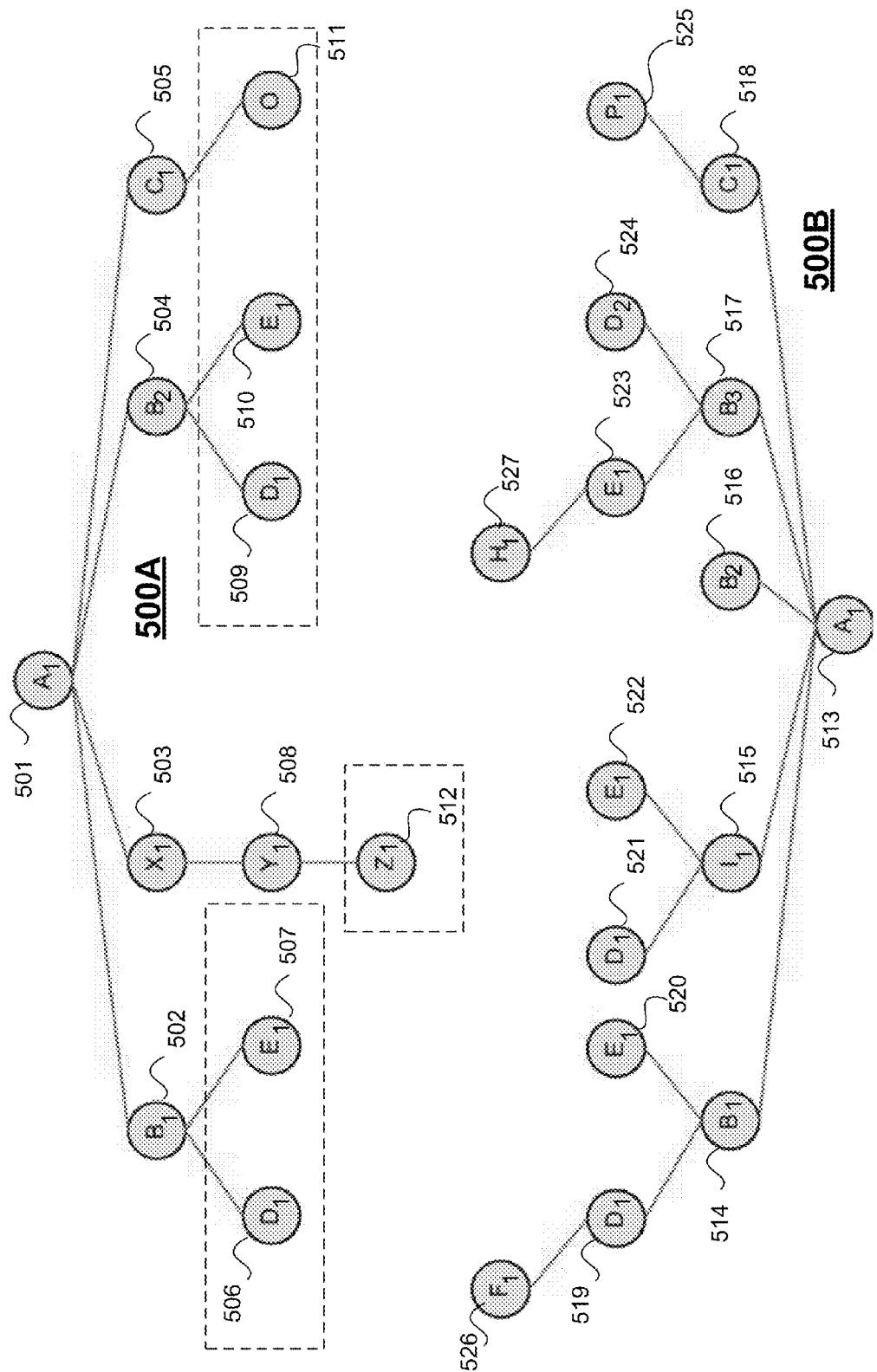
FIG. 5 shows two hierarchical tree structures representing computer program structures.

FIG. 4B illustrates a method comparing computer program structures according to an embodiment of the present invention. The process begins by determining a hierarchical level of interest. For example, in some embodiments, a hierarchical tree structure may be traversed to find the deepest common level, and this level may be used as the starting hierarchical level. This step is illustrated in FIG. 5. FIG. 5 shows two hierarchical tree structures representing computer program structures. At 401, both trees may be traversed to find a hierarchical level of interest, such as the deepest common level, for example.

As mentioned above, a computer document may be represented as a hierarchical tree structure, with each node of the tree corresponding to a subsection of the computer document. Subsections that may be represented as nodes in a hierarchy may include XML elements, routines of a computer program, or even sections of a text document (e.g., paragraphs, tables, figures, or bullet points). Branches between the nodes represent parent-child (ancestor-descendent) relationships between the nodes. In this example, nodes are labels with alphabetical characters representing the value of the node (e.g., the content of the node between start and end tags). Accordingly, node 501 has a value represented by "A", node 502 has a value represented by "B", node 503 has a value represented by "X", and node 504 has a value represented by "B" (i.e., in this example, nodes 501 and 504 have the same values). Further, since multiple nodes in a tree may have the same value, an index is used for each node in this example to distinguish between multiple sub-nodes under the same parent node that have the same value. In this example, there are two child nodes under the parent node 501 that have the same value "B". Accordingly, node 502 is labeled $B_1$ in FIG. 5 indicating that node 502 is the first node having a value "B", and node 504 is labeled $B_2$ in FIG. 5, indicating that node 504 is the second node under the same parent having a value "B". Such indexed nodes are alternatively referred to below using the convention "<node_value>[index]", where the value of the node is followed by the index in brackets (e.g., B[1] or B[2]).

At 402, one of the trees is queried for leaf nodes up to the hierarchical level of interest (e.g., leaves at the deepest common level or at a higher level). As used here, the terms query and search are used interchangeably to refer to the process of finding information (e.g., based on parameters or constraints). In an XML document, a leaf node may represent an XML element and may have values such as text. Referring again to FIG. 5, tree 500A may be queried. The query may be a search of the program or a program model, for example. In one embodiment, the search returns leaf nodes from tree 500A that either at the current hierarchical level of interest or are designated (e.g., marked) as equal or have no children. An additional constraint on the query may be that the leaf nodes returned do not have any ancestor nodes (i.e., parents, grandparents, etc. . . . ) marked as equal or similar, which is described in more detail below.

In the example shown in FIG. 5, after having determined the hierarchical level of interest (e.g., the deepest common level) for both trees, we start on that level (4). Next, the algorithm will search for and retrieve all leaf nodes of the tree 500A as described above. The tree may be searched and the nodes may be found by pre-order traversal, for example. Using a pre-order traversal search technique, the parent node is examined before the children nodes. For example, before searching nodes 506 and 507, node 502 is searched. Accordingly, the result is a sequence of B[1], D[1], E[1]. Alternatively, post order traversal or in-order traversal may be use. Post-order traversal means, after visiting children of a parent, you visit the parent. Accordingly, you will get a sequence of D[1], E[1], B[1]. There is also "in-order" traversal which will visit the tree in sequence D[1], B[1], E[1]. As mentioned above, a node may be added to the list if it has no children, if it is on the current level, or if it is marked as equal. In this example, child nodes are processed only for nodes not satisfying the first search criteria. Conversely, if a node satisfies the search criteria, the children of such node are not examined. Accordingly, in this example, a query of tree 500A for leaves up to the deepest common level (i.e., level 4) returns leaves 506, 507, 509, 510, 511, 512.

At 403, the address or location in the tree of each leaf node is determined. The address describes where in the computer program hierarchy a node may be found, and represents the location of a corresponding subsection in a program. The address includes information for identifying a program subsection within a program hierarchy. Node addresses may be unique. Nodes may be addressed by following paths from the root nodes (501, 513). These paths can either be distinctive by addressing a specific node (e.g. /A[1]/B[1]/D[1]—which addresses only node 506), or they can select a whole group of nodes. In one embodiment, an address includes a path and may include an index. The path specifies a node or multiple nodes, and an index may be used to specify a particular node. So /A/B/D would address nodes 506 and 509 in the tree 500A, because on the first level it follows label A, on the second it follows label B, and afterwards label D. However, /A[1]/B[1]/D[1] includes an index for specifying node 506 uniquely in tree 500A. For instance, each node may have an attribute specifying an index value representing the placement of the node in the computer model described above (and representing the corresponding placement of a subsection in a program). A node index may count the occurrence of a node for the same parent. Such nodes may be uniquely specified by identifying the index values and paths. For example, the same parent (e.g., node A 501) may have multiple nodes of the same type (e.g., node B1 502 and node B2 504). It is to be understood that a variety of address formats may be used to specifying the location of a node, such as a leaf, in a program hierarchy. For XML programs, an XPATH statement may be used to determine the address, for example.

At 404, the second tree is searched for nodes with the same addresses as the leaf nodes in the other tree. For example, tree 500B may be analyzed to determine if a node D with the address /A[1]/B[1]/D[1] exists. In particular, node D 506 in tree 500A may have an address of /A[1]/B[1]/D[1]. A corresponding node D 519 in tree 500B has the same address (e.g., /A[1]/B[1]/D[1]). As a further example, in one embodiment, for each node returned by the first search that is not already marked, a node from tree 500B is retrieved using distinctive Xpath statements. From node 506, the statement "XPath /A[1]/B[1]/D[1]" against tree 500B returns node 519. As each node returned by the first search is addressed in the second tree, the node may be marked "equal" or "tested" as will now be described. Nodes may include attributes for marking the node as "equal", "tested", or "similar" as set forth below, for example.

Referring again to FIG. 4, at 405, the nodes with the same addresses may be equated. For example, node 506 may have the same address as node 519 as described above. Therefore, node 519 may be set equal to node 506. In one embodiment, further checking may be performed before the nodes are equated. For example, the values of the nodes may be compared. Node 519 may have the same address as node 506, and the node may be checked to determine if the content of both nodes are the same. The content (or values) of the nodes may include the instructions included in each subsection of the hierarchical code, attributes, code, or XML text, for example. If node 506 has the same value as node 519, then this test is passed. Next, the nodes may be checked for existing marks or connections. If node 519 is not already marked (e.g., designated as equal or similar) or connected to another node in tree 500A, then this check is passed. Further, the nodes may be checked for ordering. For example, nodes of interest at the same level and under the same parent as node 506 may be examined. The ordering of nodes is the position of the nodes/subsections within another subsection or the main section of the program. The order of the nodes may correspond to where in a subsection of the hierarchical code the node can be found. For example, node D 506 may correspond to a subsection of code that precedes another subsection represented by node E 507. Accordingly, node 506 may reside in position 1 relative to other nodes. Likewise, node D 519 may correspond to a subsection of code that precedes another subsection represented by node E 520. In one example embodiment, if the value and order of the nodes are the same, the nodes may be set equal. Accordingly, referring to FIG. 5, nodes left of node 506 in tree 500A should only be connected to nodes left of node 519 in tree 500B and nodes right of node 506 in tree 500A should only be connected to nodes left of node 519 in tree 500B. While the terms left and right are used herein, it is to be understood that these are only representative of actual programming constructs. For instance, if there is an ordered list of nodes N1,N2,N3 . . . ,Ni written on paper you can simply tell if node Na is left or right of node Nb by looking at the paper. However, in this invention, such a graph is only representative of the program structure or model as mentioned above. Programmatically, a node, Na, is "left" of another node, Nb, if a program subsection represented by node Na precedes (i.e., is positioned before) another program subsection represented by node Nb. Similarly, a node, Nb, is "right" of another node, Na, if a program subsection represented by node Nb succeeds (i.e., is positioned after) another program subsection represented by node Na. It is to be understood that equating "left" with "preceding" and "right" with "succeeding" is only one example. Other equivalent arrangements could also be used. Additionally, the nodes may be checked for ancestor consistency. For example, ancestor nodes (parents, parents of parents, etc. . . . ) of 506 and 519 should either be connected to each other or not at all. If all checks are verified successfully, nodes 506 and 519 may be connected and marked as equal. Ancestor nodes of nodes 506 and 519 may be connected and marked as similar. For example, each node may have attributes in addition to a label (or name) and value. First, as mentioned above, one attribute "marked as" may be used to hold a value of "equal," "similar," "tested," or no value at all. Another attribute "connected to" may hold a reference to a node in the other tree. So nodes may be marked or connected by changing these attributes.

Continuing the example, moving from node 506 to node 507, applying XPath /A[1]/B[1]/E[1] to tree 500B returns node 520. As before, the value, marking, connection, ordering, and ancestors may be checked. Here node 520 has the same value as node 507 and it is not already marked or connected. Additionally, node 506 is connected to node 519, which is left of node 507, which passes. No nodes are on the right of node 507. Accordingly, ordering passes. As mentioned above, ancestors of 507 and 520 should either be connected to each other or not at all. Here, the direct ancestors of node 507 and 520 (e.g., 502 and 514) are connected to each other, so this check passes. Therefore, using the checks in this example, every check has succeeded, so nodes 507 and 520 may be connected and marked as equal, the ancestors of these nodes in this example are already connected and marked as similar.

Figure 6:
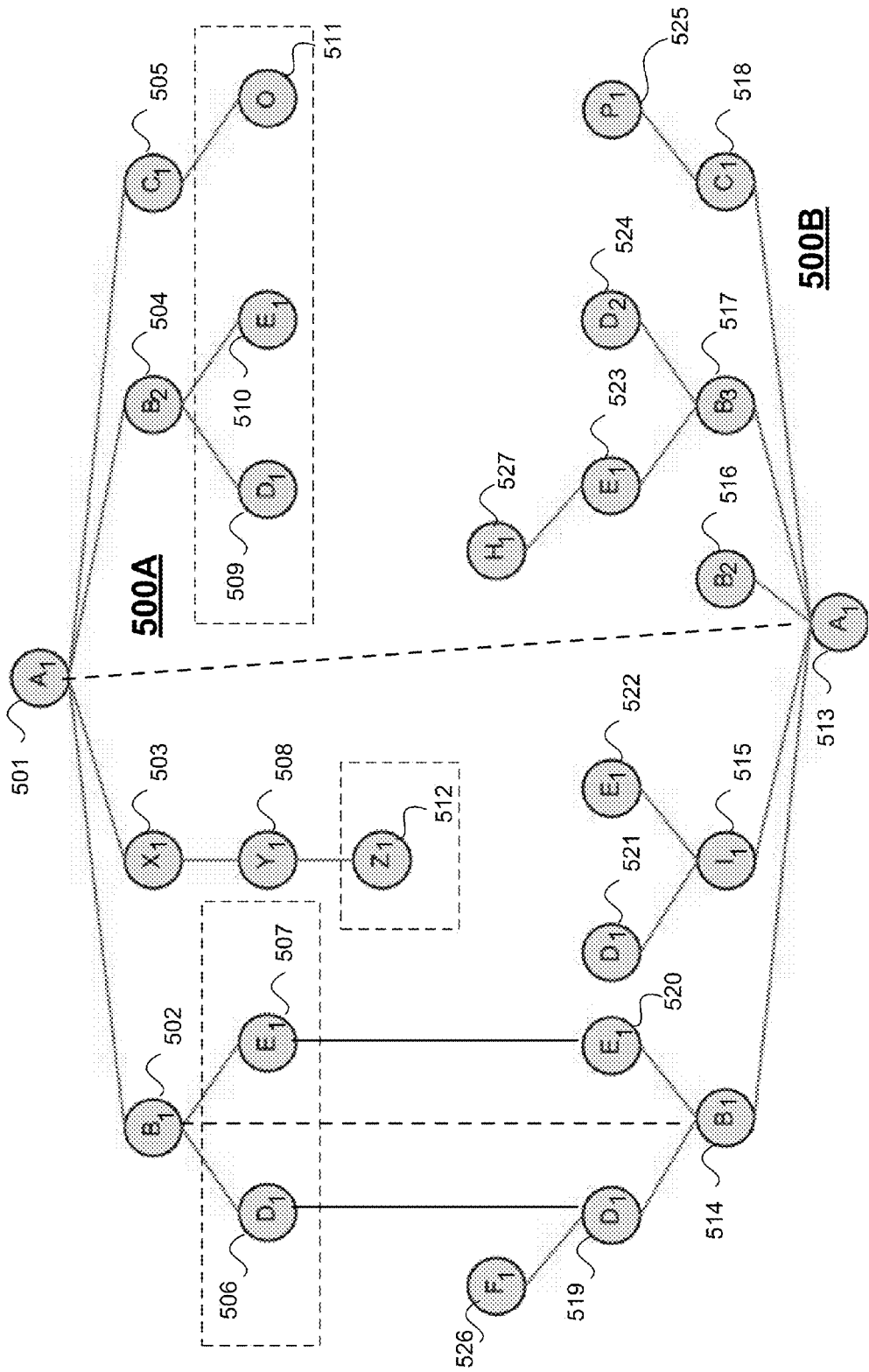
FIG. 6 illustrates equal and similar nodes for two hierarchical tree structures.

Continuing this example for the remaining nodes returned by the first search, results in the following:
1. 512—XPath /A[1]/X[1]/Y[1]/Z[1]—Tree 500B returns nothing, so mark as tested;
2. 509—Xpath /A[1]/B[2]/D[1]—Tree 500B returns nothing (/A[1]/B[2] has no child D[1]) so mark as tested;
3. 510—Xpath /A[1]/B[2]/E[1]—Tree 500B returns nothing so mark as tested
4. 511—Xpath /A[1]/C[1]/O[1]—Tree 500B returns nothing so mark as tested Referring again to FIG. 4, and as described in the above example, at 406, the ancestor nodes of the equal nodes are marked as similar. Parent nodes and ancestor nodes represent the main section and subsections of a program in which other child nodes are included as subsections. A section of a program representing a parent node may include one or many subsections that are represented by child nodes. Parent and ancestor nodes are similar if at least 1 child node is marked as equal. Accordingly, similar nodes may not have the same values or orders. FIG. 6 illustrates equal and similar nodes. Referring to FIG. 6, node 506 is marked equal to node 519 and node 507 is marked equal to node 520. Additionally, parent node 502 is marked similar to parent node 514 and the ancestor root nodes 501 and 513 have been marked as similar.

Figure 7:
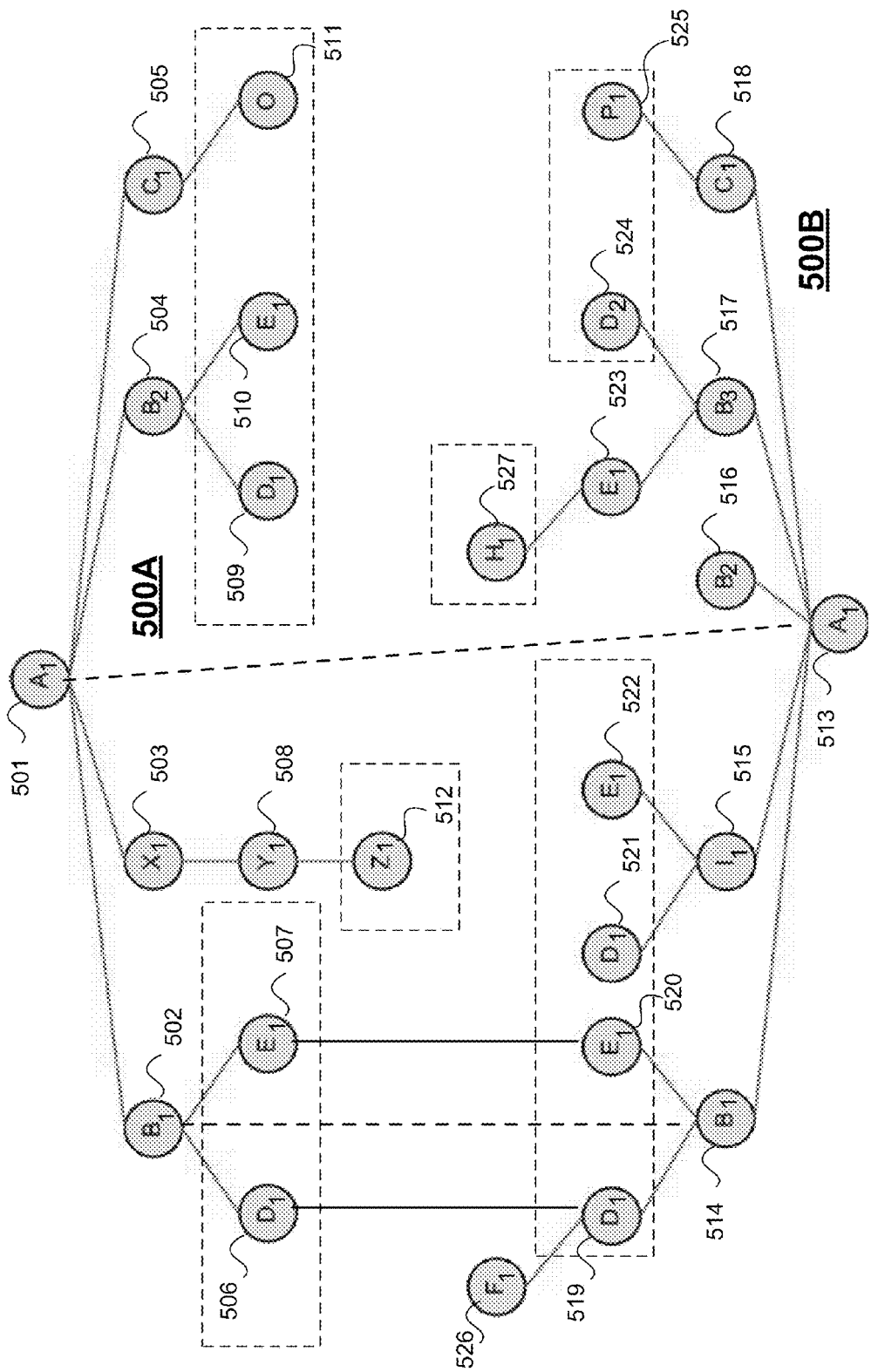
FIG. 7 illustrates the nodes returned by a second query according to one embodiment of the present invention.

After all the leaf nodes from the query at step 402 have been processed, a second query may be performed. In this query, all leaf nodes in the second tree up to the specified level (e.g., level 4) are retrieved. In one embodiment, the search returns nodes from tree 500B that are either at the current hierarchical level of interest or are designated (e.g., marked) as equal or have no children. FIG. 7 illustrates the nodes returned by a second query according to one embodiment of the present invention. For example, a second query directed at tree 500B for leaf nodes up to the deepest common level (i.e., level 4) returns leaves 519-522, 527, 524, and 525. In one embodiment, a constraint on the second query may be that the leaf nodes returned do not have any ancestor (i.e., parents) nodes marked as equal or similar. Therefore, node 526 is not in the list, because a search for nodes via preorder traversal stopped at node 519 since node 519 is marked as equal. For each node of interest from tree 500A, which is not already marked as equal or similar and is on the current level (4), nodes are selected from the list of nodes returned in the second query from tree 500B using Xpath for its group and left/right boundaries. In other words, first determine the "group" of a node in tree 500A, which may be an Xpath statement. Then this Xpath may be used to query nodes from tree 500B. A constraint in this example is to only check nodes within the "left" and "right" boundaries, thus restricting the analysis to subsections "not preceding" and/or "not succeeding" other subsections. Accordingly, the left boundary is applied, which is established by the connection between node 507 and node 520. Nodes preceding 520 from tree 500B should be excluded. If a right boundary existed, an analogues process may be used. In summary, there are three basic steps: (1) Query via (e.g., grouping) XPath, (2) remove all nodes preceding left boundary, and (3) remove all nodes succeeding right boundary. For example:

Node 512—XPath /A/X/Y/Z, left boundary is 507/520

Tree 500B returns nothing in this example. This step is illustrated at 408 in FIG. 4 where the addresses of leaves at the current level are compared without a node index constraint and matching branches are determined. In this example, node 512 is the only leaf compared. The address of node 512 may be /A/X/Y/Z. Since there are no corresponding addresses in tree 500B, the process continues to the next step. If there were a match, then the nodes may be marked as equal if their values are equal and if their parent node names and order is equal. Similarly, parent nodes may be marked as similar.

Figure 8A:
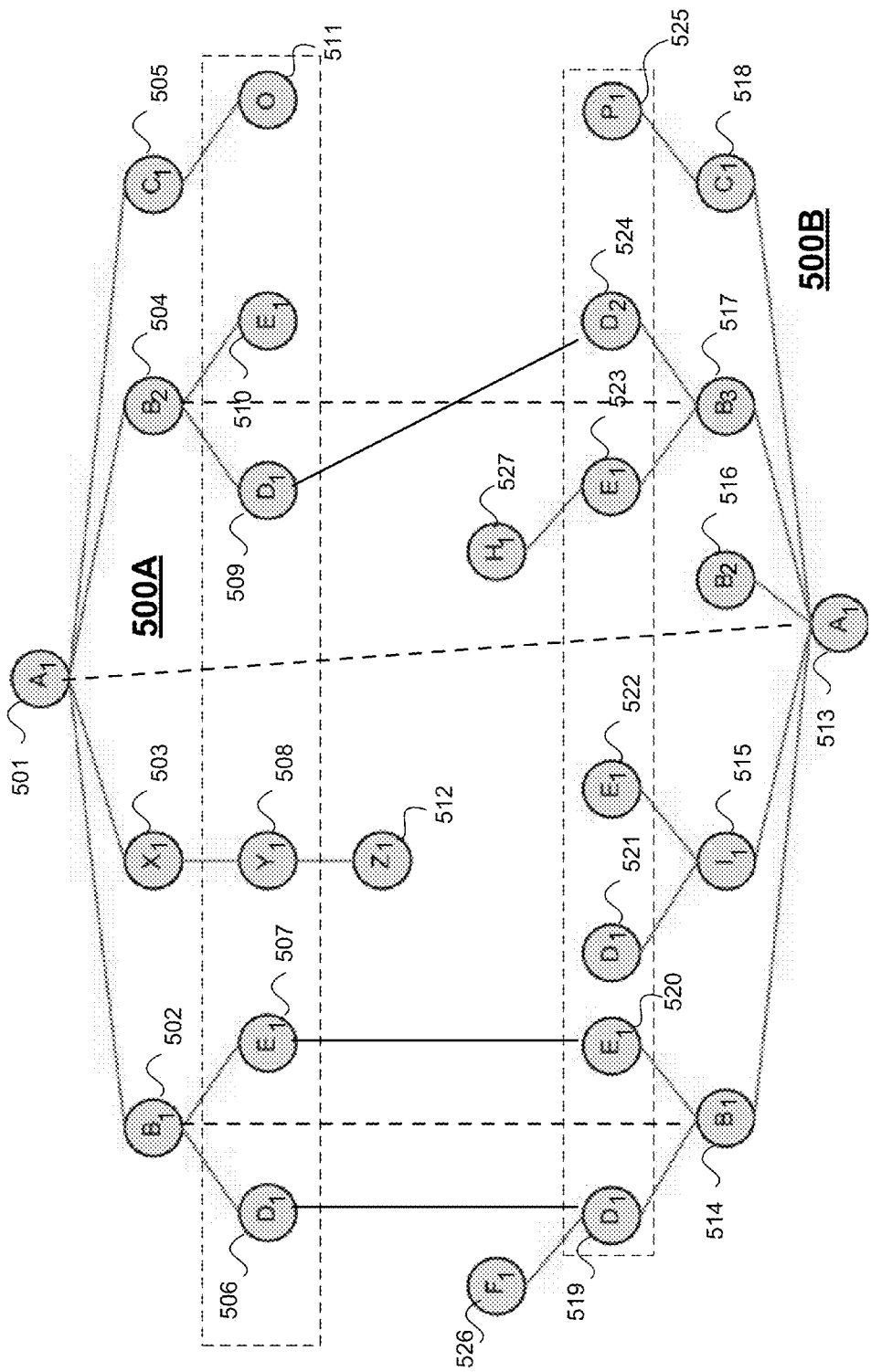
FIG. 8A-C illustrates the nodes identified on subsequent iterations of a process according to one embodiment of the present invention.

At 409, the level of interest is moved up one level in the hierarchy and the process is repeated by returning to 402. If all the leaves in the hierarchy are marked, the process stops. The following illustrates an example for the other levels. The level is incremented to level 3. FIG. 8A illustrates level 3 processing. A search is made for leaves in tree 500A at level three. The resulting nodes are 506-511. For each of these nodes, marked nodes are excluded. The only node that has not been marked in this example is node 508. Next, find an address in tree 500B via distinctive Xpath statements using index values:

Node 508—XPath /A[1]/X[1]/Y[1]

Tree 500B returns nothing, so mark node 508 as tested.

Next, search for nodes in tree 500B at the current level. The resulting nodes are nodes 519-525. For each node of interest from tree 500A that is not already marked as equal or similar and is on the current level (3) (e.g., nodes 508-511 are marked tested but not equal or similar), select nodes from list of nodes in tree 500B via Xpath for its group and left/right boundaries. First, node 508 is tested using XPath /A/X/Y with a left boundary of 507/520. In this case, tree 2 returns nothing. Next, node 509 is tested to determine the group with left/right boundaries. For node 509 a group Xpath /A/B/D with a left boundary of 507/520 may be used. In the present example, the result is nodes 519 and 524. Because of the boundary established by nodes 507 and 520, nodes preceding 520 from tree 500B should be excluded, and since node 519 is preceding 520 it is removed from the query result. Tree 2 returns node 524, so this node is marked as tested. Node 524 may then be checked for value, previous marking, and corresponding ancestors. For example, node 524 has the same value at node 509, so this check passes. Node 524 is not already marked/connected, so this test passes. The correct ordering is given implicitly by having left and right boundary. Finally, ancestors of node 524 should either be connected to each other or not at all. Here, ancestors 504 and 517 are not connected and ancestors 501 and 513 are connected to each other. Therefore, this test passes. Since every check has succeeded, nodes 509 and 524 are connected and marked as equal, and their ancestors are connected appropriately and marked as similar. For node 510, Xpath /A/B/E with left boundary of 509/524 is used. Tree 2 returns nothing for this XPath, so this node is marked as tested. Similarly, for node 511, Xpath /A/C/O with left boundary of 509/524 is used. Tree 2 returns nothing for this XPath, so this node is marked as tested. These results are illustrated in FIG. 8A. The level is incremented again and the process resumes at level 2. The above described computer implemented process is repeated for each level up to the root level.

Example Processing for Other Levels

Figure 8B:
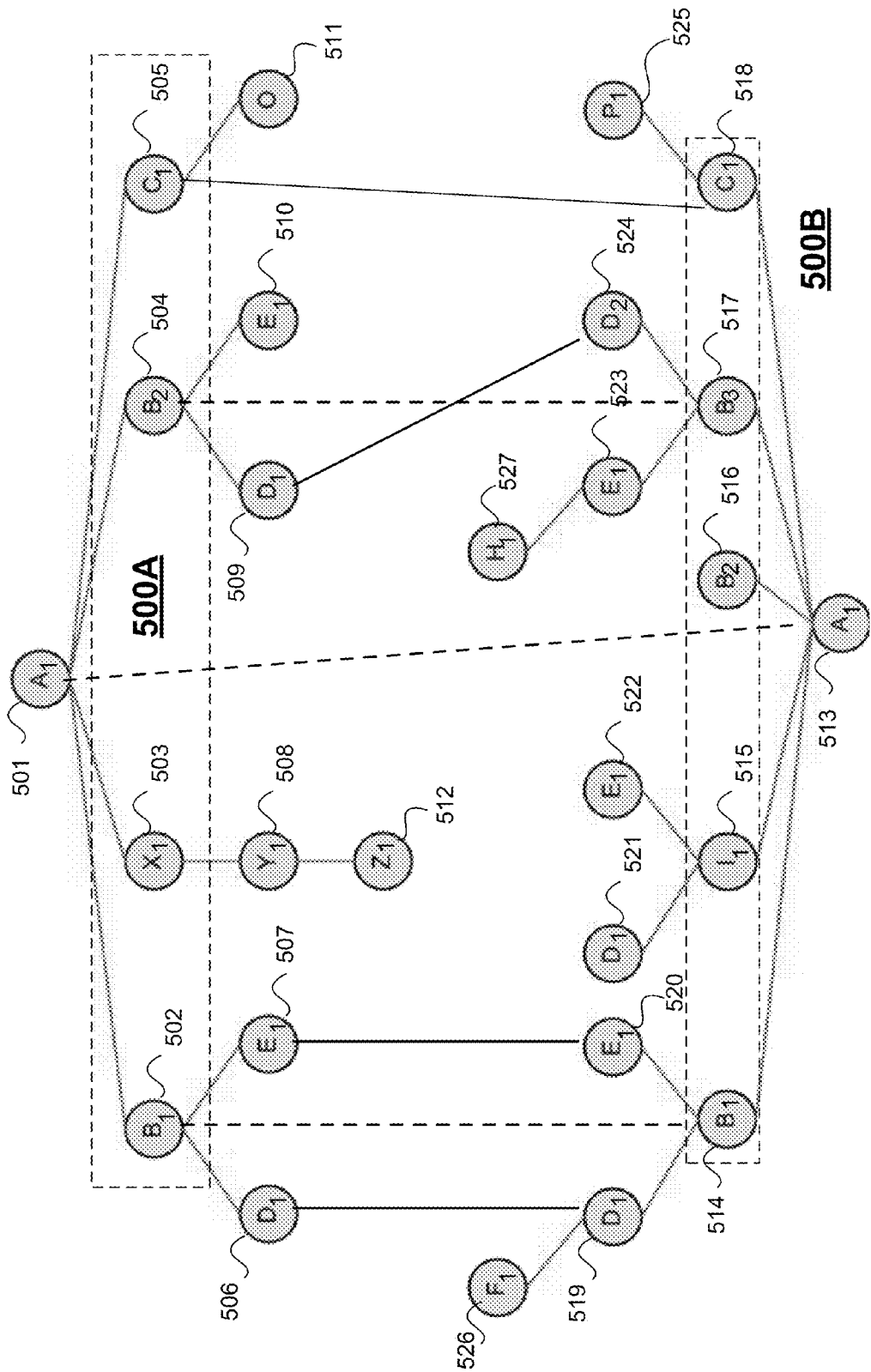

FIG. 8B illustrates level 2 processing for the current example. First, a search is conducted for all nodes at level 2 in tree 500A. The resulting nodes are nodes 502-505. Marked nodes are excluded. Nodes 502 and 504 have been marked as similar, leaving nodes 503 and 505 for processing. For each node that is not already marked (e.g., nodes 503 and 505), a node with a corresponding distinctive address in tree 500B is sought using distinctive Xpath statements.

1. Node 503—XPath /A[1]/X[1]—Tree 2 returns nothing, so mark node 503 as tested
2. Node 505—Xpath /A[1]/C[1]—Tree 2 returns node 518 so check further:
    2.1. Node 518 has the same value;
    2.2. Node 518 is not already marked/connected;
        2.2.1. Check Ordering:
            2.2.1.1. Nodes of interest left of node 505 in tree 500A should only be connected to nodes left of node 518 in tree 500B. Node 504 is connected to node 517 which is left of node 518. This check passes.
            2.2.1.2. Nodes of interest right of 505 in tree 500A should only be connected to nodes right of 518 in tree 500B. This check passes because there are no such connected nodes.
        2.2.2. Check ancestors consistency:
            2.2.2.1. Ancestors of nodes 505 and 518 should either be connected to each other or not at all. Parent/ancestor nodes 501 and 513 are connected to each other, so this check passes.

Every check has succeeded, so nodes 505 and 518 are connected and marked as equal. Their ancestors are already connected appropriately and marked as similar.

The second search is now performed on tree 500B at level 2. The resulting nodes are 514-518. For each node of interest from tree 500A, which is not already marked as equal or similar and is on the current level (2), select nodes from list of nodes of interest in tree 2 via Xpath for its group and left/right boundaries. The only node from tree 500A at this level that has not been marked equal or similar is node is node 503. Therefore, the address for node 503 is used to find corresponding nodes in tree 500B:

Node 503->XPath /A/X, left 502/514, right 504/517

Here, because node 502 is marked as similar to node 514 at this level, and because node 504 is marked similar to node 517, these node pairs make up the left and right boundaries around node 503. Accordingly, tree 2 returns nothing. The process proceeds to level 1.

Figure 8C:
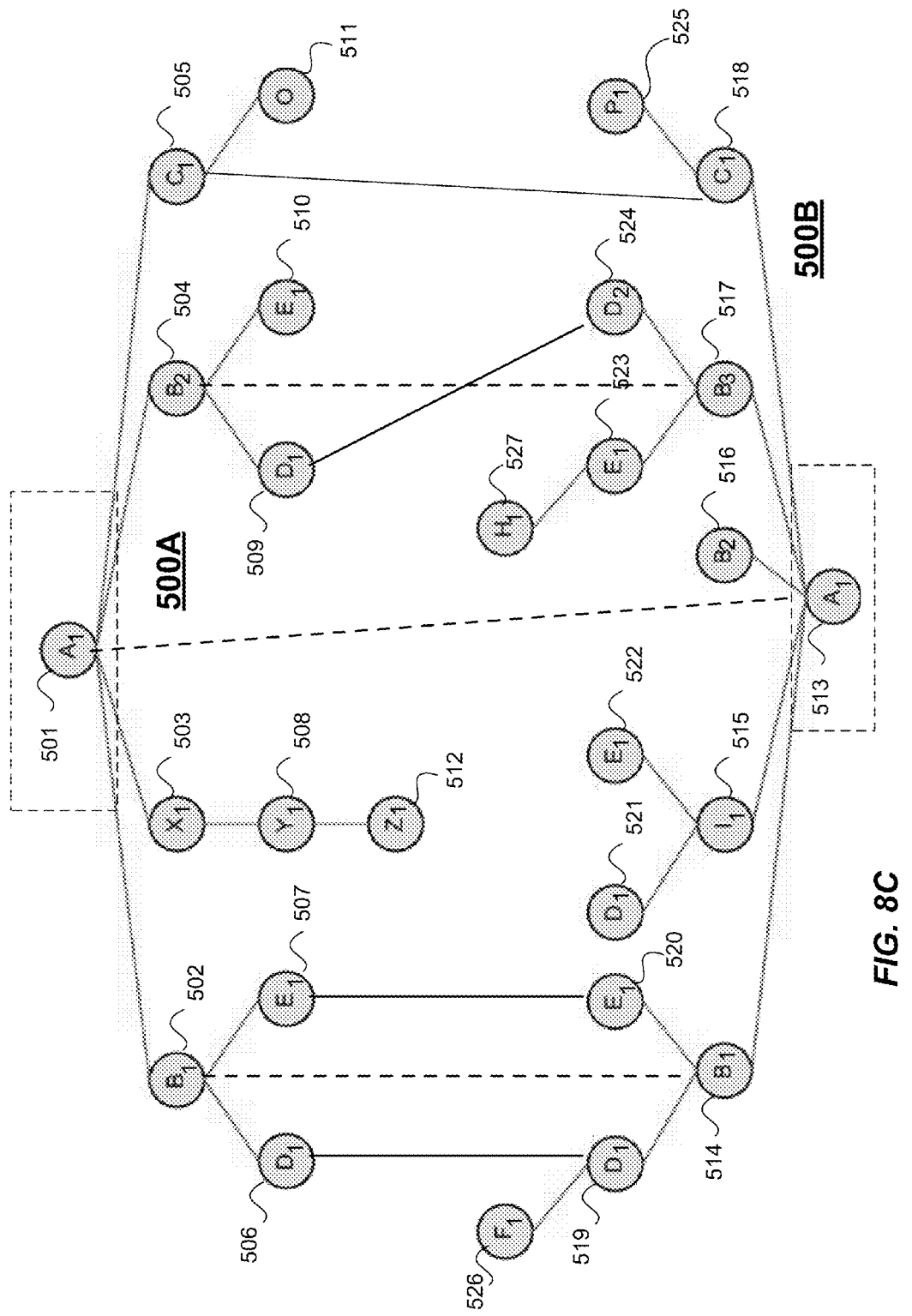

FIG. 8C illustrates level 1 processing for the current example. The process proceeds as follows:

1. Get all nodes of interest of tree 500A->returns node 501.
2. Test 1: For each node of interest (e.g., node 501), which is not already marked, try to get a node from tree 2 via distinctive Xpath statements (i.e., with index values). Node 501 is already marked (similar), so it does not have to be tested.

3. Get all nodes of interest of tree 500B->returns node 513.
4. Test 2: For each node of interest from tree 500A, which is not already marked as equal or similar and is on the current level (1), select nodes from list of nodes of interest in tree 500B via Xpath for its group and left/right boundaries. Node 513 is already marked, so it does not have to be tested.
5. Go up one level. Because we are now in level 0 the process has finished.

Figure 9:
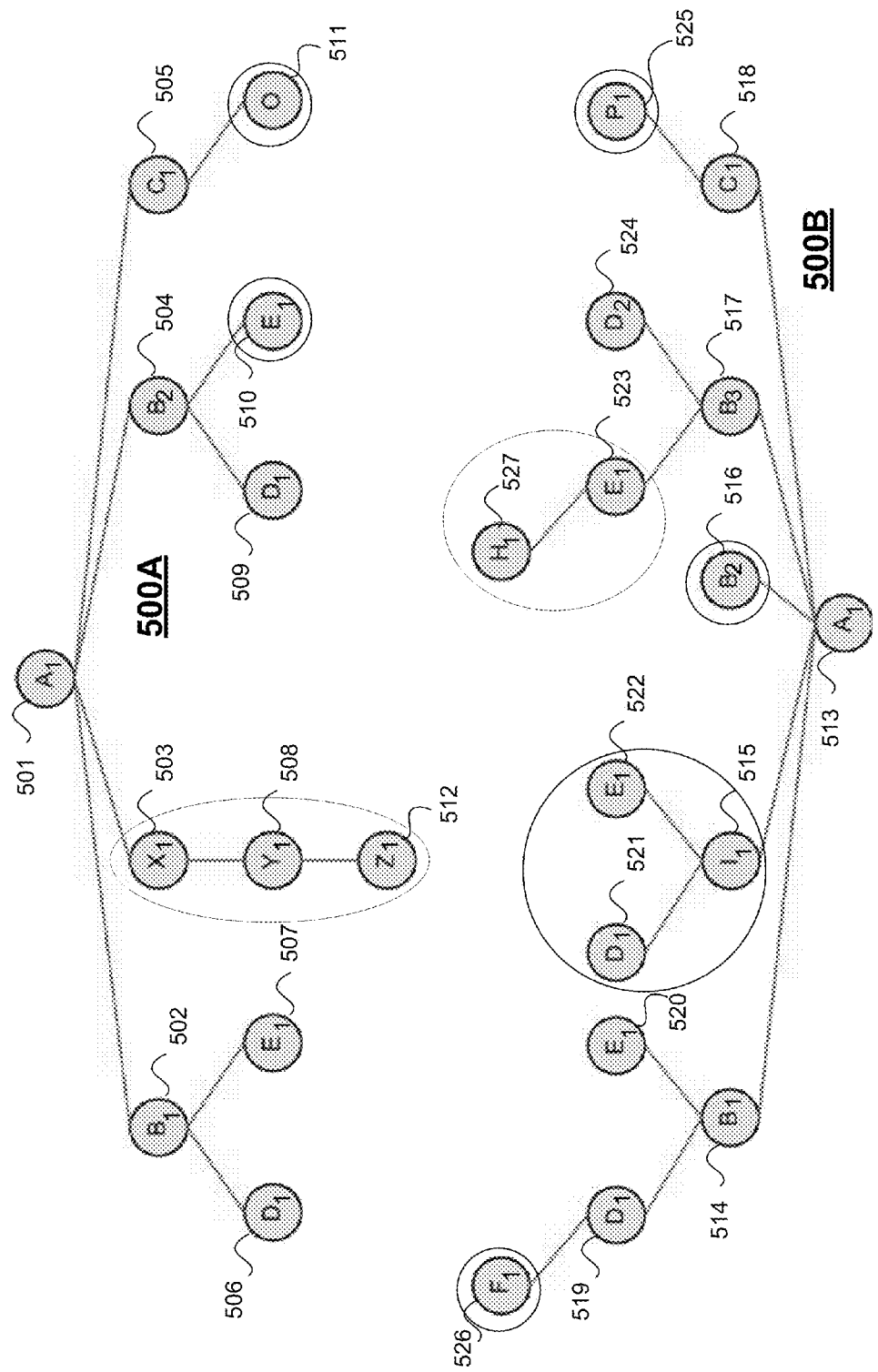
FIG. 9 illustrates insertions and deletions resulting from a hierarchical comparison process according to one embodiment of the present invention.

FIG. 9 illustrates the operations required to equate the two computer programs represented by the two trees. As illustrated in FIG. 9, nodes of a computer program or document corresponding to tree 500A may be modified by deleting certain nodes, inserting certain nodes, or changing certain nodes. For example, to derive changes, the values of "similar" nodes may be examine to determine if changes have occurred, and new values (if any) may be assigned. In FIG. 9, the comparison process has resulted in nodes 506, 5507, 509, and 505 in tree 500A being equal to nodes 519, 520, 524, and 518 in tree 500B, respectively. Likewise, nodes 502, 504, and 501 are similar to nodes 514, 517, and 513, respectively. Accordingly, nodes in tree 500A that are not marked as equal or similar are deleted. Nodes deleted from tree 500A are 503, 508, 512, 510 and 511. Nodes in tree 500B that are not marked equal or similar are inserted into tree 500B. Nodes in tree 500B that are inserted into tree 500A are nodes 526, 521, 522, 515, 523, 527, 516, and 525.

Features and advantages of an example implementation of the present invention may include improved runtime complexity. The following illustrates some of the advantages of some embodiments of the present invention:

Edit distance between two trees is a measure of relative difference between them ranging from totally equal to totally different.

T1 and T2 denote Tree 1 and Tree 2 respectively.

|T1| and |T2| denote the cardinality of Tree 1 and Tree 2 respectively.

Having an edit distance of zero, thus both trees are equal, the algorithm needs only to check nodes of interest of tree 1 at the deepest common level to recognize them as completely equal, so having a logarithmic time complexity of about O(log |T1|).

Having an edit distance of one, thus both trees are completely different, the algorithm needs to check every node of tree 1 up to the deepest common level to recognize them as completely different, so having a linear time complexity of at maximum O(|T1|).

Having an edit distance in between zero and one, the algorithm might need to check every node more than once and is only guaranteeing a quadratic time complexity of at worst O(|T1|*|T2|), but this converges towards O(log |T1|) for edit distances less than 0.5 and O(|T1|) for edit distances greater than 0.5.

Figure 10:
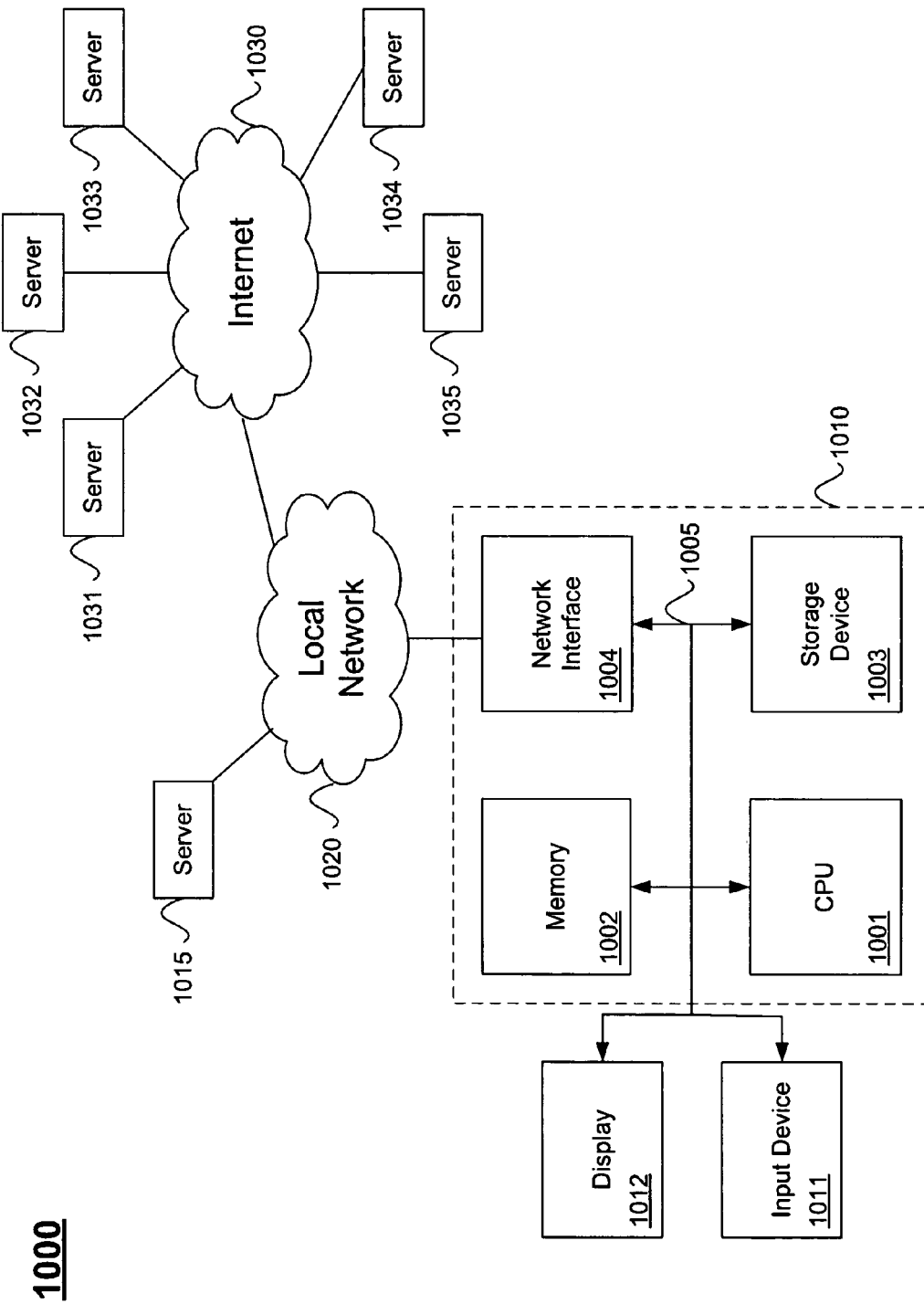
FIG. 10 illustrates a hardware system for implementing processes according to one embodiment of the present invention.

FIG. 10 illustrates a simplified diagram of a hardware system for implementing processes according to one embodiment of the present invention. Computer system 1010 includes one or more buses 1005 or other communication mechanism for communicating information, and one or more central processing units ("CPUs" or "processors") 1001 coupled with bus 1005 for processing information. The central processing unit may be configured to perform the functions described above and is the means for performing the functions described above. Computer system 1010 also includes one or more memories 1002 coupled to bus 1005 for storing information and instructions to be executed by processors 1001, including information and instructions for performing the techniques described above, for example. This memory may also be used for storing variables or other intermediate information during execution of instructions to be executed by processors 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1003 may include source code, binary code, or software files for performing the techniques or embodying the constructs above, for example.

Computer system 1010 may be coupled via bus 1005 to a display 1012, such as a cathode ray tube (CRT) or liquid crystal display (LCD), for displaying information to a computer user. An input device 1011 such as a keyboard and/or mouse is coupled to bus 1005 for communicating information and command selections from the user to processor 1001. The combination of these components allows the user to communicate with the system. In some systems, bus 1005 may be divided into multiple specialized buses.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links using radio frequency communications are another example. In any such implementation, network interface 1004 sends and receives electrical, electromagnetic, or optical signals that carry digital data streams representing various types of information.

Computer system 1010 can send and receive information, including messages or other interface actions, through the network interface 1004 to an Intranet or the Internet 1030. In the Internet example, software components or services may reside on multiple different computer systems 1010 or servers 1031-1035 across the network. The processes described above may be implemented on one or more servers, for example. A server 1031 may transmit actions or messages from one component, through Internet 1030, local network 1020, and network interface 1004 to a component on computer system 1010. Different processes may be implemented on any computer system and send and/or receive information across a network, for example. In one embodiment, the techniques describe above may be implemented by software services on one or more servers 1031-1035, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, while the nodes described in the examples above have names such as A, B, C representing subsections of programs, such nodes could also represent a statement type in XML or a title, paragraph, table, table record, or figure, etc. . . in a text document, such as Word. For example, in order to generate unique identifiers in each structure, the first paragraph B may be represented by B_1, the second paragraph B will be represented by B_2, ... The same may be done for the another Word document. Accordingly, two documents may be compared and modified, and the first document structure can be changed to the second document structure using operations such as insert, delete, and change of value with regards to the structural representation.

Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of comparing a first computer document and a second computer document comprising:
    for each of a plurality of hierarchical levels of the first computer document starting at a deepest common hierarchical level to a root level, wherein the first and second computer documents comprise subsections represented by corresponding nodes, wherein each node has an address, and wherein one or more nodes are designated as equal when a particular node corresponding to a subsection of the first computer document has the same address as a particular node corresponding to a subsection of the second computer document, and wherein one or more nodes are designated as similar when at least one descendent node is designated as equal:
        executing a first search, the first search returning a first set of nodes, wherein the first set of nodes returned by the first search correspond to subsections of the first computer document, and wherein each node in the first set of nodes satisfies at least one of the following three conditions: (i) the node has no children, (ii) the node is at the current hierarchical level being evaluated, and (iii) the node is designated as equal;
        designating one or more of the first set of nodes as equal if one or more nodes corresponding to subsections of the second computer document have the same address as one of the first set of nodes returned in response to the first search;
        designating one or more first ancestor nodes of the one or more first set of nodes as similar if at least one descendent node of a particular first ancestor node is designated as equal;
        executing a second search, the second search returning a second set of nodes, wherein the second set of nodes returned by the second search correspond to subsections of the second computer document, and wherein each node in the second set of nodes satisfies at least one of the following three conditions: (i) the node has no children, (ii) the node is at the current hierarchical level being evaluated, and (iii) the node is designated as equal;
        designating one or more of the first set of nodes at the current hierarchical level as equal to the one or more of the second set of nodes if one or more of the first set of nodes at the current hierarchical level from the first search have the same address as the one or more second set of nodes returned in response to the second search; and
        designating one or more second ancestor nodes of the one or more second set of nodes as similar if at least one descendent node of a particular second ancestor node is designated as equal.

2. The method of claim 1 further comprising deleting subsections of the first computer document having corresponding nodes marked as equal or similar, and inserting subsections of the second computer document having corresponding nodes marked as equal or similar into the first computer document.

3. The method of claim 1 further comprising:
    analyzing, before execution of the first search, said first computer document, and in accordance therewith, generating a first model representing the first computer document as a first hierarchy having a first plurality of said nodes corresponding to subsections of the first computer document; and
    analyzing, before execution of the first search, said second computer document, and in accordance therewith, generating a second model representing the second computer document as a second hierarchy having a second plurality of nodes corresponding to subsections the second computer document.

4. The method of claim 1 wherein each node address specifies a path and an index, and wherein designating one or more of the first set of nodes as equal includes identifying nodes corresponding to the second computer document having the same path and index.

5. The method of claim 1 wherein each node address specifies a path, and wherein designating one or more of the first set of nodes at the current hierarchical level as equal to the one or more nodes corresponding to subsections of the second computer document includes identifying nodes corresponding to subsections of the second computer document having the same path regardless of indices.

6. The method of claim 1 wherein the first and second computer documents are computer programs.

7. The method of claim 1 wherein the first computer document is an XML document and the second computer document is a second XML document, and wherein the nodes represent XML elements between start-tags and end-tags.

8. The method of claim 1 wherein addresses of each of the first set of nodes are used to address nodes corresponding to subsections of the second computer document using XPATH statements.

9. The method of claim 1 wherein the nodes are designated as equal only if the content of the computer document subsections corresponding to the nodes are the same.

10. The method of claim 9 wherein the nodes are designated as equal only if the position of the document subsections corresponding to the nodes are the same.

11. The method of claim 10 wherein the nodes are designated as equal only if the ancestor nodes are connected together or not connected to any other nodes.

12. The method of claim 11 wherein the nodes are designated as equal only if the nodes have not already been marked or connected.

13. The method of claim 1 wherein each node is an object comprising a marked attribute indicating that the node is equal to another node in another model.

14. The method of claim 1 wherein each node is an object comprising a connection attribute indicating that the node is connected to another node in another model.

15. A computer storage medium embodying a computer program for performing a method of comparing a first computer document and a second computer document, said method comprising:
    for each of a plurality of hierarchical levels of the first computer document starting at a deepest common hierarchical level to a root level, wherein the first and second computer documents comprise subsections represented by corresponding nodes, wherein each node has an address, and wherein one or more nodes are designated as equal when a particular node corresponding to a subsection of the first computer document has the same address as a particular node corresponding to a subsection of the second computer document, and wherein one or more nodes are designated as similar when at least one descendent node is designated as equal:

executing a first search, the first search returning a first set of nodes, wherein the first set of nodes returned by the first search correspond to subsections of the first computer document, and wherein each node in the first set of nodes satisfies at least one of the following three conditions: (i) the node has no children, (ii) the node is at the current hierarchical level being evaluated, and (iii) the node is designated as equal;

designating one or more of the first set of nodes as equal if one or more nodes corresponding to subsections of the second computer document have the same address as one of the first set of nodes returned in response to the first search;

designating one or more first ancestor nodes of the one or more first set of nodes as similar if at least one descendent node of a particular first ancestor node is designated as equal;

executing a second search, the second search returning a second set of nodes, wherein the second set of nodes returned by the second search correspond to subsections of the second computer document, and wherein each node in the second set of nodes satisfies at least one of the following three conditions: (i) the node has no children, (ii) the node is at the current hierarchical level being evaluated, and (iii) the node is designated as equal;

designating one or more of the first set of nodes at the current hierarchical level as equal to the one or more of the second set of nodes if one or more of the first set of nodes at the current hierarchical level from the first search have the same address as the one or more second set of nodes returned in response to the second search; and designating one or more second ancestor nodes of the one or more second set of nodes as similar if at least one descendent node of a particular second ancestor node is designated as equal.

16. The computer storage medium of claim 15 further comprising deleting subsections of the first computer document having corresponding nodes marked as equal or similar, and inserting subsections of the second computer document having corresponding nodes marked as equal or similar into the first computer document.

17. The computer storage medium of claim 15 wherein each node address specifies a path and an index, and
wherein designating one or more of the first set of nodes as equal includes identifying nodes corresponding to the second computer document having the same path and index.

18. The computer storage medium of claim 15 wherein the first and second set of nodes are designated as equal only if the content of the computer document subsections corresponding to the nodes are the same, a position of the document subsections corresponding to the nodes are the same, and ancestor nodes are connected together or not connected to any other nodes.

* * * * *